(12) United States Patent
Murthy et al.

(10) Patent No.: US 8,140,682 B2
(45) Date of Patent: Mar. 20, 2012

(54) SYSTEM, METHOD, AND APPARATUS FOR SERVER-STORAGE-NETWORK OPTIMIZATION FOR APPLICATION SERVICE LEVEL AGREEMENTS

(75) Inventors: Seshashayee Murthy, Yorktown Heights, NY (US); Aameek Singh, University Place, WA (US); Sandeep M. Uttamchandani, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 12/624,913

(22) Filed: Dec. 22, 2009

(65) Prior Publication Data

US 2011/0153507 A1    Jun. 23, 2011

(51) Int. Cl.
*G06Q 99/00* (2006.01)
*G06F 15/173* (2006.01)
(52) U.S. Cl. ............ 709/226; 709/223; 709/224; 718/1
(58) Field of Classification Search .................. 709/223, 709/224–226, 220–222; 718/100–108; 713/1–2, 713/100
See application file for complete search history.

(56) References Cited

U.S. PATENT DOCUMENTS

| | | | |
|---|---|---|---|
| 7,310,672 | B2 | 12/2007 | Rolia |
| 7,412,403 | B2 | 8/2008 | Subbloie et al. |
| 2005/0015641 | A1 | 1/2005 | Alur et al. |
| 2005/0021530 | A1* | 1/2005 | Garg et al. .................. 707/100 |
| 2006/0149611 | A1 | 7/2006 | Diep et al. |
| 2006/0236061 | A1 | 10/2006 | Koclanes |
| 2008/0295094 | A1* | 11/2008 | Korupolu et al. .................. 718/1 |
| 2010/0070784 | A1* | 3/2010 | Gupta et al. .................. 713/310 |

OTHER PUBLICATIONS

Singh, A.; Korupolu, M.; Mohapatra, D., "Server-Storage Virtualization: Integration and Load Balancing in Data Centers", Nov. 2008, International Conference for High Performance Computing, Networking, Storage and Analysis, 2008. SC 2008. IEEE.*
"HP Virtualization Solutions: IT Supply Meets Business Demand Enabling the Adaptive Enterprise." available at h71028.www7.hp.com/ERC/downloads/5983-0315EN.pdf, last accessed Nov. 19, 2009, 28 pages.
Auyoung et al. "Service Contracts and Aggregate Utility Functions." 15th IEEE International Symposium on High Performance Distributed Computing, (2006), pp. 119-131.

(Continued)

*Primary Examiner* — Wing Chan
*Assistant Examiner* — Ruolei Zong
(74) *Attorney, Agent, or Firm* — Jeffrey T. Holman

(57) ABSTRACT

A computer-implemented method for determining, from a system including a plurality of data center resources, at least one configuration of data center resources for an implementation of an application. The method includes receiving application information and receiving information regarding known internal features up the data center resources. The method also includes provisioning the system of data center resources and creating possible configurations of data center resources for implementing application. The method also includes correlating models and data center resources to create an interrelated representation of the models and the data center resources. The models predict a relationship of parameters for the possible configurations. The method also includes creating a multiple dimensional analysis of parameters for the possible configurations of data center resources using the interrelated representation and selecting a configuration of data center resources from the possible configurations using the multiple dimensional analysis of parameters.

20 Claims, 6 Drawing Sheets

OTHER PUBLICATIONS

Carrera et al. "Managing SLAs of Heterogeneous Workloads Using Dynamic Application Placement." Proceedings of the 17th International Symposium on High Performance Distributed Computing, (2008), pp. 217-218.

Dan et al. "A Layered Framework for Connecting Client Objectives and Resource Capabilities." International Journal of Cooperative Communication Systems, (2006), 21 pages.

Felter et al. "A Performance-Conserving Approach for Reducing Peak Power Consumption in Server Systems." Proceedings of the 19th Annual International Conference on Supercomputing, (2005), pp. 293-302.

Kallahalla et al. "SoftUDC: A Software-Based Data Center for Utility Computing." Computer, vol. 37, Issue 11, (Nov. 2004), pp. 38-46.

Karve et al. "Dynamic Placement for Clustered Web Applications." Proceedings of the 15th International Conference on World Wide Web, (2006), pp. 595-604.

Keeton et al. "On the Road to Recovery: Restoring Data After Disasters." Proceedings of the 2006 EuroSys, vol. 40, Issue 4, (Oct. 2006), pp. 235-248.

Keeton et al. "A Framework for Evaluating Storage System Dependability." Proceedings of the 2004 International Conference on Dependable Systems and Networks, (2004), pp. 877.

Keeton et al. "Designing for Disasters." Proceedings of the 3rd USENIX Conference on File and Storage Technologies, (2004), pp. 59-62.

Nathuji et al. "Exploiting Platform Heterogeneity for Power Efficient Data Centers." Proceedings of the Fourth International Conference on Autonomic Computing, (2007), pp. 5.

Nathuji et al. "VirtualPower: Coordinated Power Management in Virtualized Enterprise Systems." Proceedings of 21st ACM SIGOPS Symposium on Operating Systems Principles, (2007), pp. 265-278.

Padala et al. "Adaptive Control of Virtualized Resources in Utility Computing Environments." Proceedings of the 2nd ACM SIGOPS/EuroSys European Conference on Computer Systems, (2007), pp. 289-302.

Singh et al. "SPARK: Integrated Resource Allocation in Virtualization-Enabled SAN Data Centers." IBM Research Report RJ10407, Brief Announcement at ACM Principles of Distributed Computing, (2007), 26 pages.

Singh et al. "Server-Storage Virtualization: Integration and Load Balancing in Data Centers." Proceedings of the 2008 ACM/IEEE Conference on Supercomputing, Article No. 53, (2008), 12 pages.

Tang et al. "A Scalable Application Placement Controller for Enterprise Data Centers." Proceedings of the 16th International Conference on World Wide Web, (2007), pp. 331-340.

Verma et al. "Power-Aware Dynamic Placement of HPC Applications." Proceedings of the 22nd Annual International Conference on Supercomputing, (2008), pp. 175-184.

Verma et al. "Compass: Cost of Migration-Aware Placement in Storage Systems." 10th IFIP/IEEE International Symposium on Integrated Network Management, (May 2007), pp. 50-59.

Ward et al. "Appia: Automatic Storage Area Network Fabric Design." Proceedings of the 1st USENIX Conference on File and Storage Technologies, Article No. 15, (2002), 15 pages.

Wood et al. "Black-box and Gray-box Strategies for Virtual Machine Migration." 4th USENIX Symposium on Networked Systems Design & Implementation, (2007), pp. 229-242.

\* cited by examiner

SYSTEM, METHOD, AND APPARATUS FOR SERVER-STORAGE-NETWORK OPTIMIZATION FOR APPLICATION SERVICE LEVEL AGREEMENTS

BACKGROUND

Administrative tasks for provisioning, change management, disaster recovery planning, problem determination, etc. are becoming increasingly application-centric where the goal is to provide service level agreements (SLAs) at the application level rather than individual layers of storage, servers, and networks. Growing virtualization of server-storage-networks is changing the way data centers have traditionally been managed and evolving into the "dynamic data-center" model where logical units of computation, storage, network bandwidth can be allocated and continuously changed at run-time based on the changing workload characteristics.

Traditionally, resource allocation decisions are done within individual tiers. For example, conventional allocation of storage involves finding a storage volume that can satisfy the capacity, performance, availability requirements. This approach, while simple, has limitations of possibly selecting a volume which has insufficient path bandwidth or an unreliable switch from the server to the selected storage volume.

The related work for resource optimization frameworks can be divided into four categories as shown in Table 1 below; each category has different pros and cons in representation of domain knowledge (referred to as "facts" in expert systems terminology) and the optimization formalism.

TABLE 1

| | Knowledge Representation (facts) | Knowledge Usage (formalisms) | Limitations/Challenges |
| --- | --- | --- | --- |
| Policy Based | Event-Condition-Action Rules "Canned Recipes" | Scanning for applicable rules | Complexity, brittleness |
| Pure Feedback Based | Little or no information about system details. Use instantaneous reaction as basis for future action | Incrementally explore different permutations within the state-space | Infeasible for production systems with a large solution-space |
| Empirical/Learning Based | Recording system behavior in different states | Finding a recorded state that is "closest" to the current state | Error-prone and infeasible in real-world systems with large number of parameters |
| Model Based | Mathematical or logical functions-- predictors of system behavior. Originally proposed for system diagnostics | Optimizing based on predicted system-state for different permutations of parameters | Representation of models. Creation and evolution of models. Formalisms for reasoning. Inaccuracies in predicted values. |

SUMMARY

Embodiments of a computer-implemented method are described. In one embodiment, the computer-implemented method is a method for determining, from a system including a plurality of data center resources, at least one configuration of data center resources for an implementation of an application. The method includes receiving application information and receiving information regarding known internal features up the data center resources. The method also includes provisioning the system of data center resources and creating possible configurations of data center resources for implementing application. The method also includes correlating models and data center resources to create an interrelated representation of the models and the data center resources. The models are configured to predict a relationship of parameters for the possible configurations. The method also includes creating a multiple dimensional analysis of parameters for the possible configurations of data center resources using the interrelated representation and selecting a configuration of data center resources from the possible configurations using the multiple dimensional analysis of parameters.

In another embodiment, the computer-implemented method is a method by a consolidated virtualization workbench for determining, from a system comprising a plurality of data center resources, at least one configuration of data center resources for an implementation of an application. The method includes receiving application information, receiving information regarding known internal features of the data center resources, and provisioning the system of data center resources. The method also includes creating possible configurations of data center resources for implementing the application and correlating white-box models, black-box models, and the data center resources to create an interrelated representation of the white-box models, black-box, models, and the data center resources. The white-box models use known internal features of the data center resources to predict a relationship of cost, risk, and performance for the possible configurations. The black-box models use measured data from reference architectures and the data center resources to predict the relationship of cost, risk, and performance for the possible configurations. The method also includes creating a multiple dimensional analysis of cost, risk, and performance for the possible configurations of data center resources using the interrelated representation and selecting a configuration of data center resources from the possible configurations using the multiple dimensional analysis of cost, risk, and performance. Other embodiments of the computer-implemented method are also described.

Embodiments of a computer program product are also described. In one embodiment, the computer program product includes a computer useable storage medium to store a computer readable program for a consolidated virtualization workbench for determining, from a system including a plurality of data center resources, at least one configuration of data center resources for an implementation of an application. The application, when executed on a computer, causes the computer to perform operations, including an operation to receive application information, receive information regarding known internal features of the data center resources, and provision the system of data center resources. The computer program product also includes operations to create possible configurations of data center resources for implementing the application and correlating white-box models, black-box models and the data center resources to create an interrelated representation of the white-box models, black-box models and the data center resources. The white-box models use known internal features of the data center resources to predict a relationship of parameters for the possible configurations. The black-box models use measured data from reference architectures and the data center resources to predict the relationship of parameters for the possible configurations. The computer program product also includes operations to create a multiple dimensional analysis of parameters for the possible configurations of data center resources using the interrelated representation and select a configuration of data center resources from the possible configurations using the multiple dimensional analysis of parameters. Other embodiments of the computer program product are also described.

Embodiments of a system are also described. In one embodiment, the system is a system for a consolidated virtualization workbench for determining at least one configuration of data center resources for an implementation of an application. In one embodiment, the system includes one or more data center resources, an application in communication with the one or more data center resources, and a consolidated virtualization workbench. The application uses the one or more data center resources for implementation of the application. The consolidated virtualization workbench includes an application service level agreement (SLA) receiver to receive application information from the application, a data collection infrastructure to receive information regarding known internal features of the data center resources, a solution generator, a multi-dimensional optimizer, and an admin interface. The solution generator creates possible configurations of data center resources for implementing the application and correlates models and the data center resources to create an interrelated representation of the models and the data center resources. The models predict a relationship of parameters for the possible configurations. The multi-dimensional optimizer creates a multiple dimensional analysis of parameters for the possible configurations of data center resources using the interrelated representation. The admin interface receives a selection of a configuration of data center resources from the possible configurations using the multiple dimensional analysis of parameters. Other embodiments of the system are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

In certain embodiments, a consolidated virtualization workbench takes application service level objectives (SLOs) as input and generates a list of configuration plans as output. Each configuration plan has details of servers, storage, and network paths to be allocated for the given application SLO. The consolidated virtualization workbench ranks the configuration plans based on attributes. The attributes used to rank the configuration plans may include cost, performance, and risk.

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments provision an application service level agreement (SLA) with server, storage, and network resources. Some embodiments also provide run-time optimization for redistributing resources based on changing workload characteristics.

Figure 1:
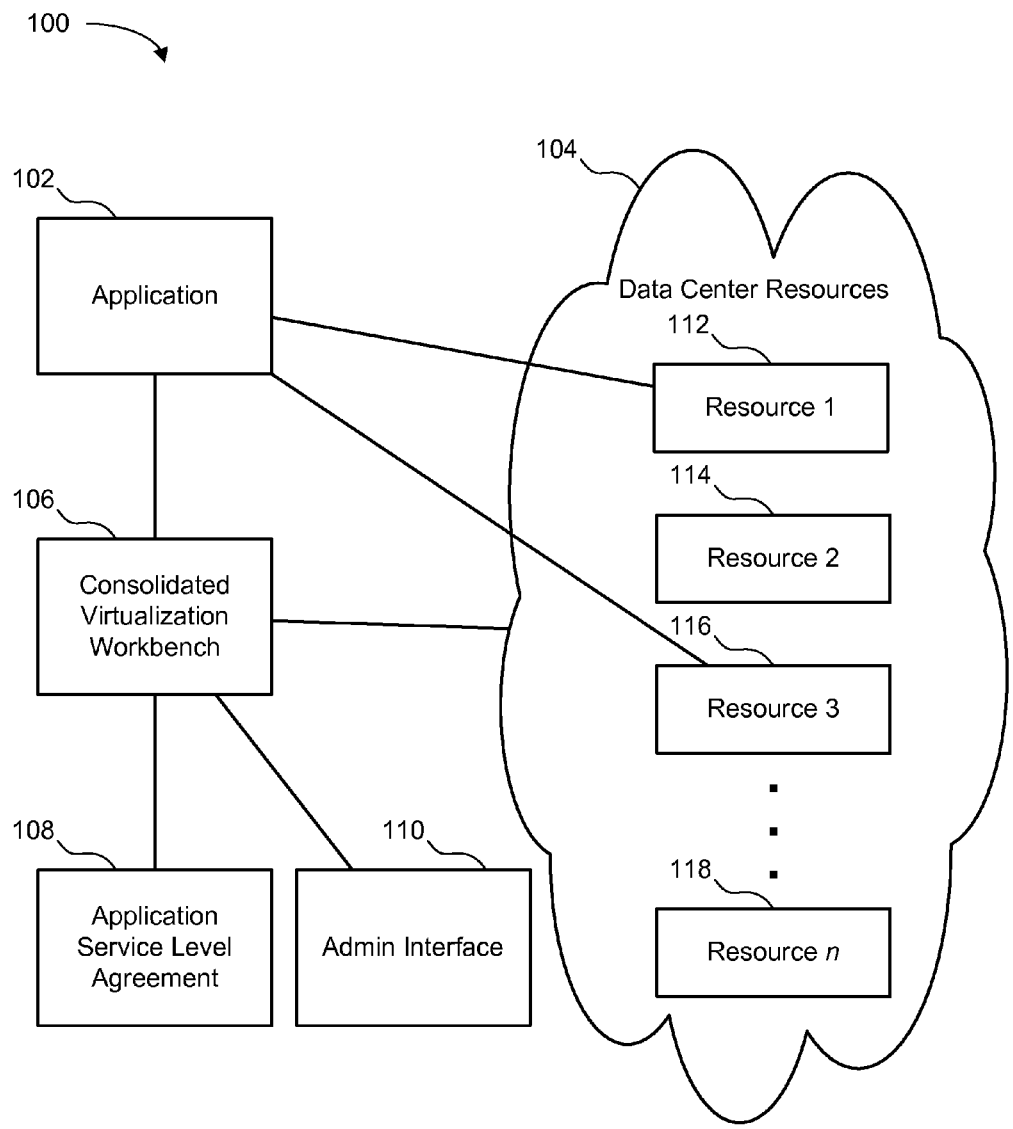
FIG. 1 depicts a schematic diagram of one embodiment of a system for a consolidated virtualization workbench for determining a configuration of data center resources for an application.

FIG. 1 depicts a schematic diagram of one embodiment of a system 100 for a consolidated virtualization workbench (CVW) 106 for determining a configuration of data center resources 104 for an application 102. The system 100 includes the application 102, one or more data center resources 104, the consolidated virtualization workbench 106, an application service level agreement 108, and an admin interface 110. The system 100 takes the application SLA 108 as input and generates a list of configuration plans as output. The output configuration plans describe a configuration of one or more data center resources 104 that satisfy the application SLA 108.

The application 102, in one embodiment, is an application that consumes one or more data center resources 104 in order to perform a function. The application 102 may operate on a dedicated application server (not shown), or it may be allocated to operate on an application server represented by one of the data center resources 104. The application 102 may be any type of application that consumes data center resources 104. For example, the application 102 may be a web service that uses data center resources 104 to operate, including an application server, network resources, and a database.

The data center resources 104 may include one or more resources in a data center. In the illustrated example, the data center resources 104 include n individual resources, where n is any arbitrary number. Each resource in the data center resources 104 may be any resource in a data center. For example, resource 1 112 may be an application server, while resource 2 114 may be a database. Resource 3 116 may be an Internet protocol (IP) switch, and resource n may be a storage volume. In some configurations, the data center resources 104 may include thousands of individual resources. In another embodiment, the data center resources 104 may be spread across more than one physical data center.

In some embodiments, the data center resources 104 are configured to be allocated to one or more applications 102. The data center resources 104 perform tasks, such as computation, providing data, or transmitting data, according to the application 102. In one embodiment, the data center resources 104 include one or more server elements, one or more storage elements, and one or more network fabric elements. In some embodiments, the data center resources 104 include many individual resources capable of performing a particular task for the application 102.

Individual resources within the data center resources 104, in some embodiments, include performance characteristics. In certain embodiments, individual resources within the data center resources 104 include dependencies upon other resources. Some individual resources, in one embodiment, may include path dependencies. These performance characteristics, dependencies, and path dependencies may differ between individual resources.

The CVW 106, in one embodiment, determines one or more possible configurations of data center resources 104 for the application 102. Possible configurations of data center resources, in some embodiments, include at least one server element, at least one storage element, and at least one network fabric element. The CVW 106, in certain embodiments, discovers the data center resources 104 and characteristics of individual resources within the data center resources 104. In one embodiment, the CVW 106 includes one or more models that model the characteristics of individual resources within the data center resources 104. In some embodiments, the CVW 106 monitors resources within the data center resources 104 to update the one or more models that model the characteristics of the individual resources.

The CVW 106, in one embodiment, receives an application SLA 108 for the application 102 and generates a list of one or more configurations of data center resources 104 to satisfy the application SLA 108. The CVW 106 uses the models that model the characteristics of individual resources within the data center resources 104 to create the one or more configurations of data center resources 104 to satisfy the application SLA 108. The CVW 106 is described in greater detail in relation to FIG. 2.

The application SLA 108, in one embodiment, defines a required level of performance for the application 102. The application SLA 108 may describe any measurable performance metric along with a required value for that performance metric. In some embodiments, the application SLA 108 may describe several performance metrics along with a required value. For example, the application SLA 108 may specify an online transaction processing (OLTP) of 10,000 transactions per second and a warehouse size of 1 terabyte (TB). In another example, the application SLA 108 includes parameters for CPU cycles per second, storage capacity, storage input/output operations per second, input/output characteristics, maximum latency, and/or an availability requirement.

In one embodiment, the admin interface 110 provides an interface to interact with an administrator. The admin interface 110 displays the list of potential configurations generated by the CVW 106 and receives an input selecting one of the potential configurations for provisioning. For example, the admin interface 110 may be a web-based portal that displays the list of potential configurations and receives an input selecting one of the potential configurations for provisioning.

Figure 2:
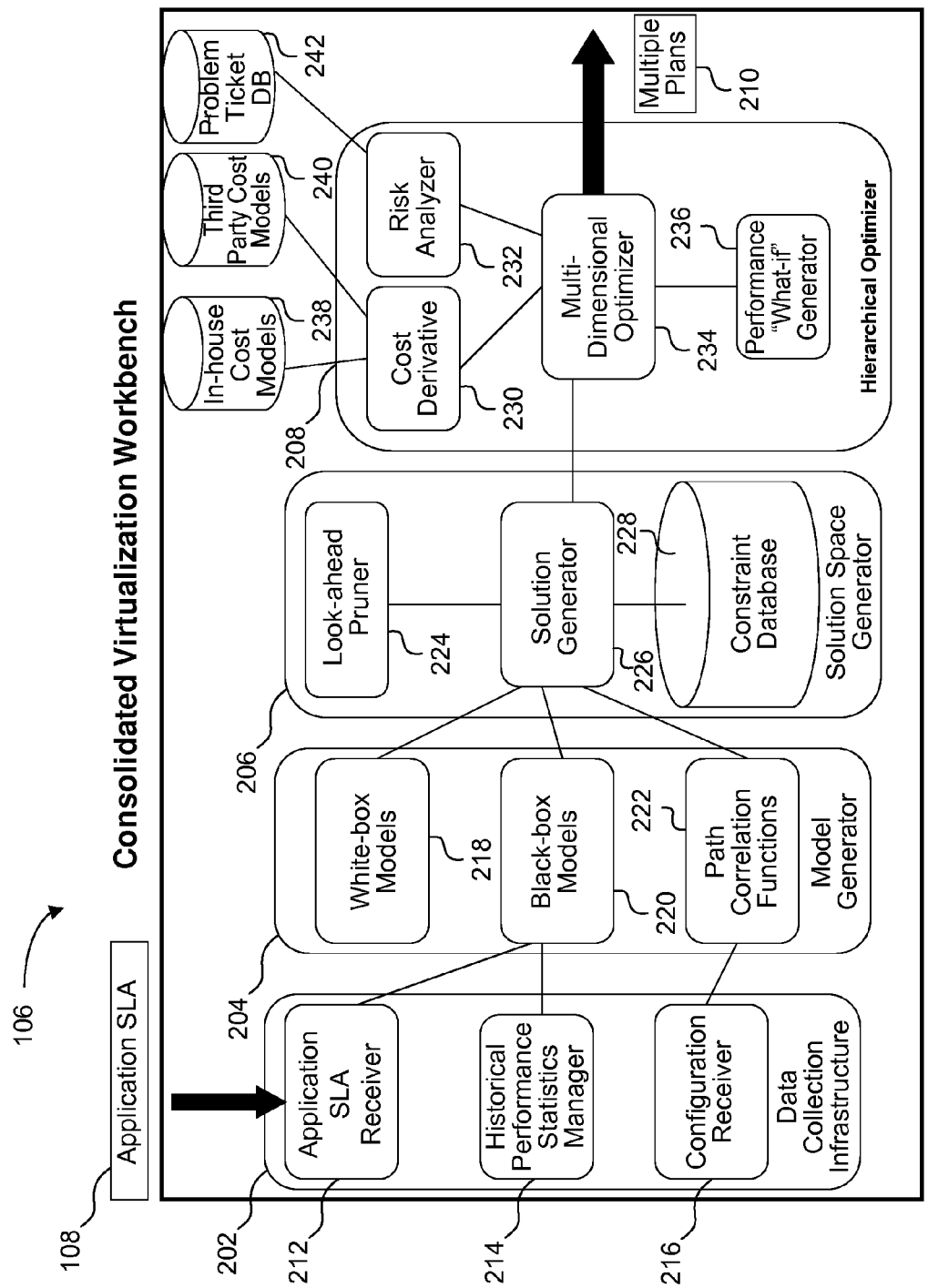
FIG. 2 depicts a schematic diagram of one embodiment of the consolidated virtualization workbench of FIG. 1.

FIG. 2 depicts a schematic diagram of one embodiment of the consolidated virtualization workbench (CVW) 106 of FIG. 1. The CVW 106 includes a data collection infrastructure 202, a model generator 204, a solution space generator 206, and a hierarchical optimizer 208. The CVW 106, in one embodiment, receives an application SLA 108 and outputs multiple configuration plans 210 that satisfy the application SLA 108.

The data collection infrastructure 202, in one embodiment, includes an application SLA receiver 212, a historical performance statistics manager 214, and a configuration receiver 216. The data collection infrastructure 202 collects data that make up the input for the CVW 106.

In one embodiment, the application SLA receiver 212 receives the application SLA 108. In some embodiments, the application SLA receiver 212 receives the application SLA 108 from the application 102. In another embodiment, the application SLA receiver 212 receives the application SLA 108 separately. For example, the application SLA 108 may be transmitted to the application SLA receiver 212 by the admin interface 110. The application SLA receiver 212, in one embodiment, transmits the application SLA 108 to the model generator 204 for use in generating models that satisfy the application SLA 108.

The historical performance statistics manager 214, in one embodiment, tracks performance statistics of one or more data center resources 104. The historical performance statistics manager 214 communicates the performance statistics to the model generator 204 for production of models that reflect the performance of the data center resources 104.

In some embodiments, the historical performance statistics manager 214 is connected to the data center resources 104 and directly tracks performance statistics of individual resources 104 as they operate. In another embodiment, the historical performance statistics manager 214 receives the performance statistics without being directly connected to the data center resources 104. For example, reference performance statistics for a data center resource 104 may be input at the admin interface 110. In a further embodiment, the historical performance statistics manager 214 tracks the performance of individual data center resources during run time of the application 102 after the data center resources 104 have been provisioned for the application 102. For example, the historical performance statistics manager 214 may track the performance of a data center resource 104 during run time of the application 102 and update the performance statistics of the data center resource 104.

The configuration receiver 216, in one embodiment, receives information about the configuration of one or more data center resources 104. In some embodiments, the configuration receiver 216 discovers the configuration of the data center resources 104. For example, the configuration receiver 216 may be connected to the one or more data center resources 104 and may query the data center resources 104 for configuration information. In an alternative embodiment, the configuration receiver 216 may receive configuration information without being connected to the data center resources 104. For example, the configuration receiver 216 may receive configuration information from the admin interface 110. The configuration receiver 216, in some embodiments, communicates the configuration information to the model generator 204.

The model generator 204, in one embodiment, includes one or more white-box models 218, one or more black-box models 220, and one or more path correlation functions 222. The model generator 204 generates models that describe performance of the data center resources 104.

In one embodiment, a white box-model 218 describes the performance of a data center resource based on an understanding of the internals of data center resource components. For example, a white-box model 218 for a data center resource that includes a collection of storage volumes having known performance may incorporate the known performance of the storage volumes to create a model that predicts the performance of the data center resource 104. A white-box model 218 is provided to the solution space generator 206 for use in predicting a relationship of parameters for possible configurations of data center resources 104 for provisioning the application 102.

In some embodiments, a black-box model 220 uses measured data to predict the performance of the data center resource 104. In one embodiment, a black-box model 220 models performance using a regression function based on measured data. For example, the historical performance statistics manager 214 may provide measured data for the historical performance of a data center resource 104. The model generator 204 may generate a black-box model 220 that is a regression function based on this measured data. The black-box model 220, in one embodiment, is provided to the solution space generator 206 for use in predicting a relationship of parameters for possible configurations of data center resources 104 for provisioning the application 102.

In some embodiments, the model generator 204 updates one or more black-box models 220 during run time of the application 102. For example, a data center resource 104 may perform differently than predicted at the time of provisioning. The historical performance statistics manager 214 may track the performance of this data center resource 104 and provide updated performance data to the model generator 204. The model generator 204 may generate a new black-box model 224 for the data center resource 104 that more accurately reflects the updated performance data.

The path correlation functions 222, in one embodiment, determine dependencies between one or more data center resources 104. For example, resource 1 112 may require the use of resource 3 116. A path correlation function 222, in this example, indicates that a configuration for provisioning the application 102 using resource 1 112 also includes resource 3 116. The path correlation function 222 is provided to the solution space generator 206 for use in predicting a relationship of parameters for possible configurations of data center resources 104 for provisioning the application 102.

The solution space generator 206, in one embodiment, includes a look-ahead pruner 224, a solution generator 226, and a constraint database 228. The solution space generator 206 generates one or more configurations that satisfy the requirements of the application SLA 108.

The look-ahead pruner 224, in one embodiment, eliminates some possible configurations from consideration based on future predicted workloads on the data center resources 104. In some embodiments, the look-ahead pruner 224 analyzes future predicted workloads based on growth of the requirements of the application 102 as it is more heavily utilized in the future. In one embodiment, the look-ahead pruner 224 analyzes future predicted workloads of other applications (not shown) operating on the data center resources 104 and uses impact analysis of the other applications to determine if the configuration is a viable configuration. For example, the look-ahead pruner 224 may determine that other applications will consume more data center resources 104 in the future and prune a possible configuration that uses data center resources 104 that will be used by the other applications.

The solution generator 226, in one embodiment, generates possible configurations of data center resources 104 that satisfy the application SLA 108. In some embodiments, the solution generator 226 responds to inputs from the data collection infrastructure 202 to determine what configurations are viable. In another embodiment, the solution generator 226 responds to inputs from the look-ahead pruner 224 to determine what configurations are viable. In a further embodiment, the solution generator 226 responds to inputs from the constraint database 228 to determine what configurations are viable. The solution generator 226, in one embodiment, transmits possible configurations to the hierarchical optimizer 208.

In some embodiments, the solution generator 226 uses a bin packing algorithm to select data center resources 104 for the possible configurations. In another embodiment, the solution generator 226 uses a genetic algorithm to select data center resources 104 for the possible configurations. The solution generator 226 also sorts possible configurations. In one embodiment, the solution generator 226 sorts possible configurations using the look-ahead heuristics. For example, the solution generator 226 may sort possible configurations by headroom for growth of data center resource requirements.

The constraint database 228, in one embodiment, includes one or more constraints that operate on possible configurations of data center resources 104. The constraint database 228 communicates constraints to the solution generator 226 which uses the constraints to determine if a possible configuration is viable. In one embodiment, a constraint is an interoperability constraint that it indicates if two or more data center resources may operate in the same configuration. In another embodiment, a constraint is a reference architecture specification that indicates a configuration having known performance. In one embodiment, a constraint in the constraint database 228 is a best practices guideline that indicates a configuration that complies with best practices.

The hierarchical optimizer 208, in one embodiment, includes a cost derivative 230, a risk analyzer 232, a multi-dimensional optimizer 234, and a performance "what-if" generator 236. The hierarchical optimizer 208 generates a list of possible configurations that reflect the optimal configurations based on cost, risk, and/or performance of the application 102.

The cost derivative 230, in one embodiment, determines a cost of a possible configuration. The cost is determined by the cost derivative 230 based on models. In one embodiment, the cost derivative 230 receives in-house cost models 238 that are generated to model the cost based on in-house knowledge. In a further embodiment, the cost derivative 230 receives third party cost models 240 that model the cost of the configuration based on models generated by a third party. The cost derivative 230 communicates the cost of the possible configuration to the multi-dimensional optimizer 234.

The risk analyzer 232 determines a risk for a possible configuration of data center resources 104. The risk analyzer 232 communicates the risk to the multi-dimensional optimizer 234. In some embodiments, the risk analyzer 232 determines the risk for a possible configuration using a model based on problem tickets submitted to a problem ticket database 242. For example, the problem ticket database 242 may track problems submitted by one or more users of the data center resources 104. The risk analyzer 232 may access the problem ticket database 242 to determine a frequency of problems for a data center resource 104, and generate a risk model based on the frequency of problems.

The performance "what-if" generator 236, in one embodiment, models the performance of a possible configuration. In some embodiments, the performance "what-if" generator 236 analyzes a configuration provided by the solution generator 226 to determine a performance of the configuration. In a further embodiment, the performance "what-if" generator 236 adjusts one or more parameters of the possible configuration and determines if the performance is improved. The performance "what-if" generator 236 may select the adjusted configuration for submission to the multi-dimensional optimizer 234.

The multi-dimensional optimizer 234, in one embodiment, sorts the possible configurations of data center resources 104 according to parameters to generate multiple configuration plans 210 for presentation in the admin interface 110. In some embodiments, the multi-dimensional optimizer 234 sorts the configuration plans 210 according to cost, risk, and/or performance of the application 102. Other embodiments may use other factors. In some embodiments, the multi-dimensional optimizer 234 assigns weights to parameters. For example, performance may be weighted to be twice as important as cost.

Figure 3:
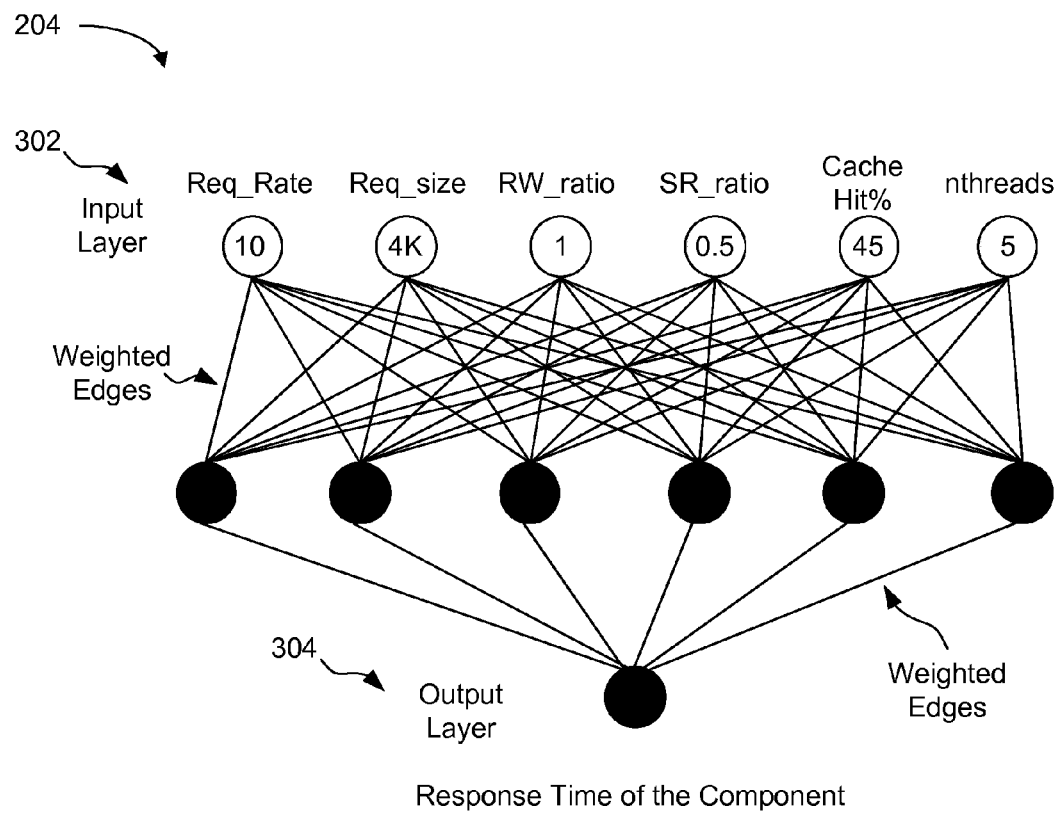
FIG. 3 depicts a schematic diagram of one embodiment of the model generator of FIG. 2.

FIG. 3 depicts a schematic diagram of one embodiment of the model generator 204 of FIG. 2. The model generator 204 includes an input layer 302 and an output layer 304. The model generator 204 generates a black-box model 220 for a data center resource 104.

In one embodiment, the input layer 302 includes inputs for one or more parameters that impact the output of the black-box model 220. In the illustrated example, parameters in the input layer 302 include request size, RW ratio, SR ratio, cache hit percentage, and/or nthreads. Relationships between the parameters are indicated by weighted edges, and mathematical relationships in the black-box model 220 based on the weighted edges produce the result of the black-box model 220 at the output layer 304. In the illustrated example, the output layer 304 indicates the response time of the data center resource 104.

Figure 4:
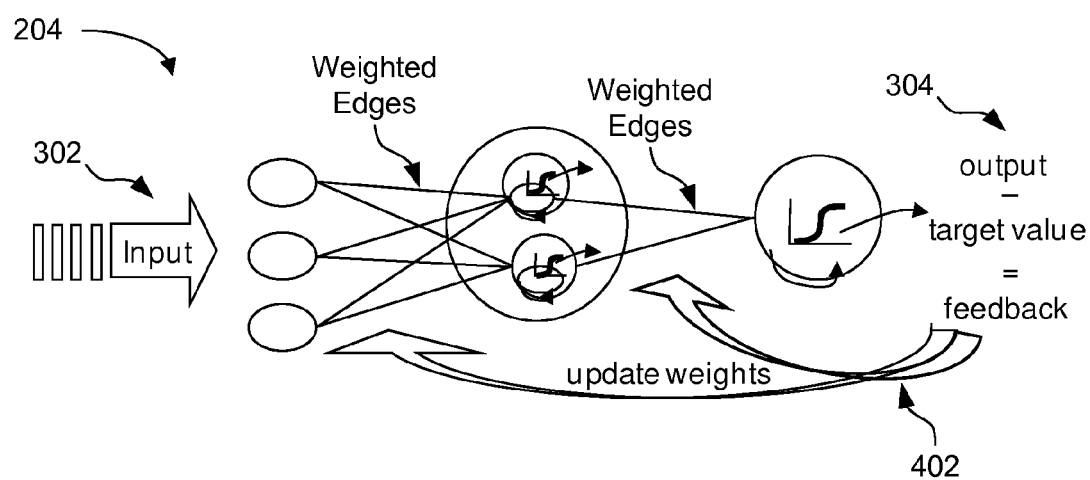
FIG. 4 depicts a schematic diagram of another embodiment of the model generator of FIG. 2.

FIG. 4 depicts a schematic diagram of another embodiment of the model generator 204 of FIG. 2. The model generator 204 includes the input layer 302 and the output layer 304, as described above. The model generator 204 responds to feedback 402 to refine a black-box model 220 for a data center resource.

In one embodiment, the data collection infrastructure 202 monitors the performance of data center resources 104 during operation of the application 102. The data collection infrastructure 202 provides updated performance data to the model generator 204. The model generator 204, in one embodiment, compares the actual performance data to the predicted performance to generate feedback 402 for the black-box model 220. In some embodiments, the feedback 402 is provided regularly while the application 102 operates. For example, the model generator 204 may analyze the feedback 402 for the black-box model 220 at a specified time interval and update the black-box model 220 when the analysis of the feedback 402 indicates that an update is can be performed. By updating the black-box model 220 in response to the feedback 402, the consolidated virtualization workbench 106 can more accurately optimize configurations for the application 102. In some embodiments, the consolidated virtualization workbench 106 re-provisions data center resources 104 for the application 102 in response to updated black-box models 220.

Figure 5:
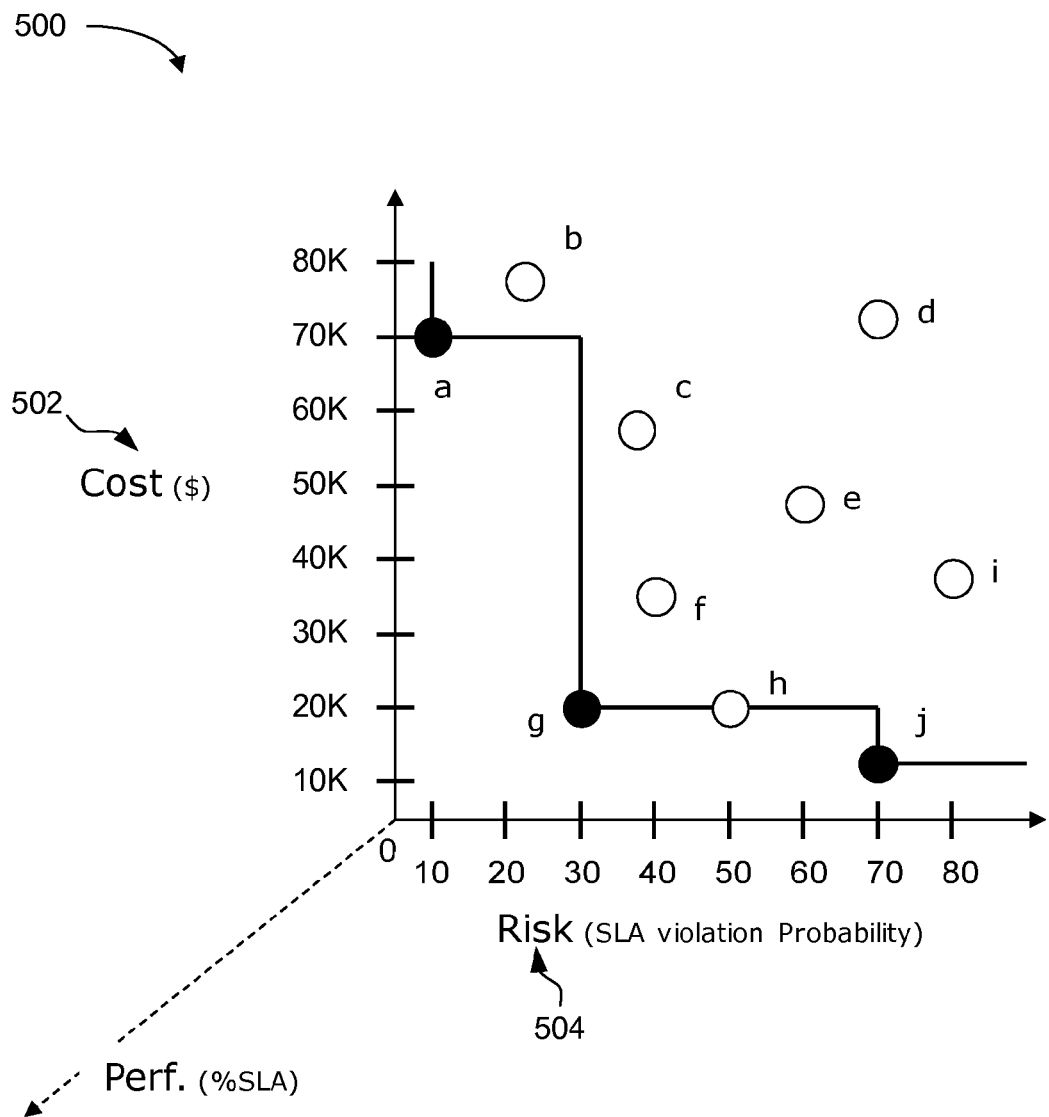
FIG. 5 depicts a schematic diagram of one embodiment of a method for use of the multi-dimensional optimizer of FIG. 2.

FIG. 5 depicts a schematic diagram of one embodiment of a method 500 for use of the multi-dimensional optimizer 234 of FIG. 2. The illustrated method 500 is a skyline method for selecting configurations for presentation in the admin interface 110. In the method 500, possible configurations a-j are plotted against a first parameter 502 and a second parameter 504. In the illustrated embodiment, the first parameter 502 is cost of the configuration and the second parameter 504 is risk of the configuration, specifically, risk that the application SLA 108 will be violated.

The configuration having the lowest value for the second parameter 504 is selected. In the illustrated embodiment, the configuration having the lowest value for risk 504 is configuration a. Next, the method 500 finds the configuration that has the next lowest value for the second parameter 504. If the identified configuration has a lower value for the first parameter than the previously selected configuration, the identified configuration is selected. If the identified configuration does not have a lower value for the first parameter then the previously selected configuration, the method 500 returns to the step of finding the configuration that has the next lowest value for the second parameter 504. In the illustrated embodiment, the method 500 finds configuration b, which is not selected because it has a cost 502 higher than that of configuration a. The method 500 goes on to find configuration g, which is selected because it has a cost 502 lower than configuration a. The method 500 repeats this process until no other configurations are found. The selected configurations, in one embodiment, are then presented to an administrator in the admin interface 110 for selection.

In a further embodiment, the method 500 can be expanded to include more than two dimensions. In this embodiment, configurations are selected based on improving performance, cost, or risk over previously selected configurations. The selected configurations are then presented to an administrator in the admin interface 110 for selection.

Figure 6:
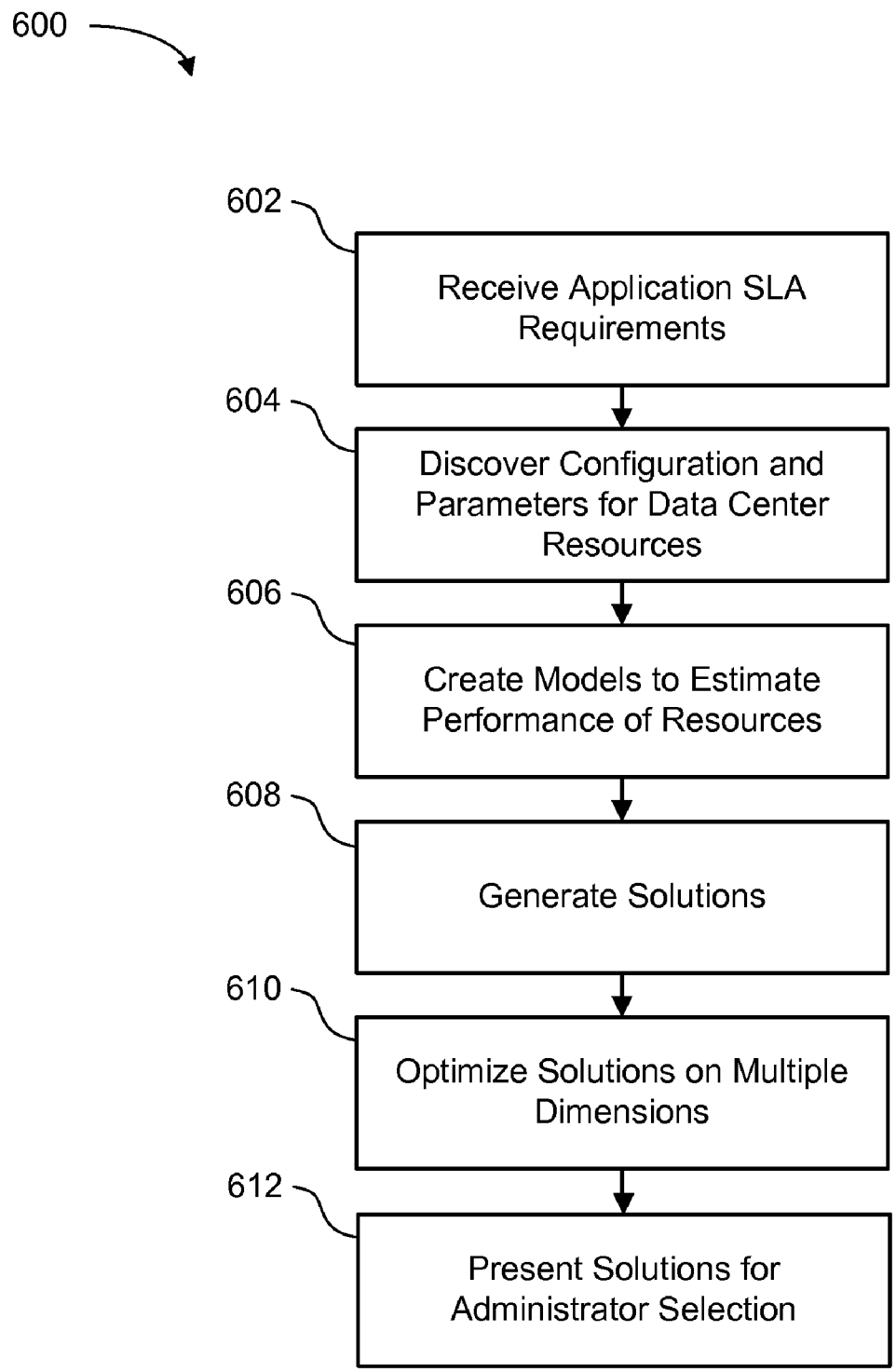
FIG. 6 is a flowchart diagram depicting one embodiment of a method for determining a configuration of data center resources for an application.

FIG. 6 is a flowchart diagram depicting one embodiment of a method 600 for determining a configuration of data center resources 104 for an application 102. The method 600 is, in certain embodiments, a method of use of the systems and apparatuses of FIGS. 1-5, and is described with reference to those figures. Nevertheless, the method 600 may also be conducted independently thereof and is not intended to be limited to the specific embodiments discussed above with respect to those figures.

In the method 600, the application SLA receiver 212 receives 602 application SLA requirements. The application SLA requirements may include parameters required by the application 102 to meet performance goals. Examples of parameters in the application SLA requirements include, but are not limited to, calculations per second, storage capacity, input/output per second, maximum input/output latency, input output workload template, and CPU workload template.

The configuration receiver 216 discovers 604 a configuration and parameters for the data center resources 104. In some embodiments, the configuration receiver 216 discovers 604 the configuration parameters by directly querying the data center resources 104. In an alternative embodiment, the configuration receiver 216 discovers 604 the configuration and parameters by receiving the configuration parameters from another component, such as the admin interface 110. Examples of a configuration and parameters discovered 604 by the configuration receiver 216 include, but are not limited to, a number and type of servers, storage capacity, installed software, network components, and network fabric.

The model generator 204 creates 606 one or more models to estimate performance of the data center resources 104. In one embodiment, the model generator 204 creates black-box models 220 using regression functions. In certain embodiments, the black-box models 220 are updated during run time of the application 102. In one embodiment, the model generator 204 creates 606 one or more white-box models 218 by receiving information about the known performance of particular components in the data center resources 104.

The solution generator 226, in some embodiments, generates one or more solutions that include one or more possible configurations that satisfy the performance requirements of the application SLA 108. In some embodiments, the solution generator 226 receives input from the look-ahead pruner 224 and the constraint database 228 to determine which generated configurations are viable.

The multi-dimensional optimizer 234 optimizes 610 the solutions generated 608 by the solution generator 226 on multiple dimensions. In some embodiments, the multi-dimensional optimizer 234 optimizes 610 solutions based on cost, risk, and performance of the application 102 given the configuration. In one embodiment, the multi-dimensional optimizer 234 optimizes 610 and selects configurations using a skyline technique.

The admin interface 110 presents 612 solutions including one or more configurations selected by the multi-dimensional optimizer 234. The presented solutions may include a list of configurations, and the admin interface 110 may allow for a selection of a particular configuration for provisioning the application 102.

It should also be noted that at least some of the operations for the methods may be implemented using software instructions stored on a computer useable storage medium for execution by a computer. As an example, an embodiment of a computer program product includes a computer useable storage medium to store a computer readable program for a consolidated virtualization workbench for determining, from a system including a plurality of data center resources, at least one configuration of data center resources for an implementation of an application that, when executed on a computer, causes the computer to perform operations, including an operation to receive application information, receive information regarding known internal features of the data center resources, and provision the system of data center resources. The computer program product also includes operations to create possible configurations of data center resources for implementing the application and correlating white-box models, black-box models and the data center resources to create an interrelated representation of the white-box models, black-box models and the data center resources. The white-box models use known internal features of the data center resources to predict a relationship of parameters for the possible configurations. The black-box models use measured data from reference architectures and the data center resources to predict the relationship of parameters for the possible configurations. The computer program product also includes operations to create a multiple dimensional analysis of parameters for the possible configurations of data center resources using the interrelated representation and select a configuration of data center resources from the possible configurations using the multiple dimensional analysis of parameters.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method by a consolidated virtualization workbench for determining, from a system comprising a plurality of data center resources, at least one configuration of data center resources for an implementation of an application, comprising:
    receiving application information;
    receiving information regarding known internal features of the data center resources;
    provisioning the system of data center resources;
    creating possible configurations of data center resources for implementing the application;
    correlating models and the data center resources to create an interrelated representation of the models and the data center resources, wherein:
        the models are configured to predict a relationship of parameters for the possible configurations;
    eliminating at least one possible configuration based on future predicted workloads on the data center resources due to growth requirements of the application;
    creating a multiple dimensional analysis of parameters for the possible configurations of data center resources using the interrelated representation; and
    selecting a configuration of data center resources from the possible configurations using the multiple dimensional analysis of parameters.

2. The computer-implemented method of claim 1, wherein the parameters comprise cost, risk, and performance of the application.

3. The computer-implemented method of claim 1, wherein the models comprise one or more white-box models configured to use known internal features of the data center resources to predict a relationship of parameters for the possible configurations.

4. The computer-implemented method of claim 3, wherein the models comprise one or more black box models configured to use measured data from reference architectures and the data center resources to predict the relationship of parameters for the possible configurations.

5. The computer-implemented method of claim 4, further comprising:
    in response to provisioning the system, applying the white-box models configured to use the known internal features of the data center resources to predict the relationship of parameters for the possible configurations;
    wherein selecting the configuration of data center resources comprises:
        selecting one of the possible configurations using the white-box model predictions for implementation of the application based upon pre-defined desired parameters; and
        implementing the application on the selected configuration of data center resources.

6. The computer-implemented method of claim 5, wherein selecting the configuration of data center resources further comprises:
    measuring data center resource performance and overall system performance of the data center resources from the provisioned system;
    creating black-box models from the measured data center resource performance and the measured overall system performance, wherein the black-box models comprise regression functions and correlation functions; and
    amending the predicted relationship of parameters for the selected configuration using the black-box models.

7. The computer-implemented method of claim 1, wherein: the data center resources comprise:
    a plurality of server elements;
    a plurality of storage elements; and
    a plurality of network fabric elements; and selecting the configuration of data center resources comprises selecting:
        at least one server element from the plurality of server elements;
        at least one storage element from the plurality of storage elements; and
        at least one network fabric elements from the plurality of network fabric elements.

8. The computer-implemented method of claim 1, further comprising pruning the possible configurations as a viable configuration for implementing the application using impact analysis of other applications implemented on the data center resources.

9. A computer program product comprising a non-transitory computer useable storage medium to store a computer readable program for a consolidated virtualization workbench for determining, from a system comprising a plurality of data center resources, at least one configuration of data center resources for an implementation of an application, wherein the computer readable program, when executed on a computer, causes the computer to perform operations comprising:
    receiving application information;
    receiving information regarding known internal features of the data center resources;
    provisioning the system of data center resources;
    creating possible configurations of data center resources for implementing the application;
    correlating white-box models, black-box models and the data center resources to create an interrelated representation of the white-box models, black-box models and the data center resources, wherein:
        the white-box models are configured to use known internal features of the data center resources to predict a relationship of parameters for the possible configurations; and
        the black-box models are configured to use measured data from reference architectures and the data center resources to predict the relationship of parameters for the possible configurations;
    eliminating at least one possible configuration based on future predicted workloads on the data center resources due to growth requirements of the application;
    creating a multiple dimensional analysis of parameters for the possible configurations of data center resources using the interrelated representation; and
    selecting a configuration of data center resources from the possible configurations using the multiple dimensional analysis of parameters.

10. The computer program product of claim 9, further comprising determining a path correlation function to analyze dependencies between data center resources in the possible configurations of data center resources.

11. The computer program product of claim 10, wherein the possible configurations of data center resources for implementing the application satisfy the dependencies in the path correlation function.

12. The computer program product of claim 9, further comprising a constraint database, and wherein selection of a configuration of data center resources satisfies one or more constraints in the constraint database.

13. The computer program product of claim 12, wherein the one or more constraints in the constraint database include one or more of:
    an interoperability constraint;
    a reference architecture specification; and
    a best practices guideline.

14. A system for a consolidated virtualization workbench for determining at least one configuration of data center resources for an implementation of an application, the system comprising:
    one or more data center resources comprising a processor coupled to a memory element;
    an application in communication with the one or more data center resources and configured to use the one or more data center resources for implementation of the application; and
    a consolidated virtualization workbench comprising:
        an application service level agreement (SLA) receiver to receive application information from the application;

a data collection infrastructure to receive information regarding known internal features of the data center resources;

a solution generator to:

create possible configurations of data center resources for implementing the application; and correlate models and the data center resources to create an interrelated representation of the models and the data center resources, wherein the models are configured to predict a relationship of parameters for the possible configurations;

a look-ahead pruner to eliminate at least one possible configuration based on future predicted workloads on the data center resources due to growth requirements of the application;

a multi-dimensional optimizer to create a multiple dimensional analysis of parameters for the possible configurations of data center resources using the interrelated representation; and an admin interface to receive a selection of a configuration of data center resources from the possible configurations using the multiple dimensional analysis of parameters.

15. The system of claim 14, further comprising a risk analyzer configured to weight a risk parameter in response to reported problems recorded in a problem ticket database, the risk analyzer providing an input to the multi-dimensional optimizer.

16. The system of claim 14, further comprising a cost derivative configured to weight a cost parameter in response to a cost model, the cost parameter providing an input to the multi-dimensional optimizer.

17. The system of claim 16, wherein the cost model comprises an in-house cost model.

18. The system of claim 16, wherein the cost model comprises an third party cost model received from a third party.

19. The system of claim 14, wherein the data collection infrastructure comprises a historical performance statistics manager configured to receive performance statistics relating to the one or more data center resources.

20. The system of claim 19, wherein the historical performance statistics manager is configured to receive performance statistics relating to the one or more data center resources during a runtime of the application, and to provide the performance statistics received during runtime of the application to the models.

* * * * *